(12) United States Patent
Liu et al.

(10) Patent No.: US 12,122,261 B2
(45) Date of Patent: Oct. 22, 2024

(54) STATE CONTROL SYSTEM AND METHOD FOR VEHICLE WITH BATTERY TO BE SWAPPED, CONTROLLER, AND STORAGE MEDIUM

(71) Applicant: NIO TECHNOLOGY (ANHUI) CO., LTD, Hefei (CN)

(72) Inventors: Yizhi Liu, Hefei (CN); Zhe Sun, Hefei (CN); Xinyi Shen, Hefei (CN); Bohong Xiao, Hefei (CN); Jianing Qi, Hefei (CN); Chengqun Ni, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 197 days.

(21) Appl. No.: 17/703,146

(22) Filed: Mar. 24, 2022

(65) Prior Publication Data
US 2022/0305949 A1     Sep. 29, 2022

(30) Foreign Application Priority Data
Mar. 24, 2021   (CN) .......................... 202110313266.1

(51) Int. Cl.
*B60L 53/80*     (2019.01)
*B60L 15/20*     (2006.01)
(Continued)

(52) U.S. Cl.
CPC ........... *B60L 53/80* (2019.02); *B60L 15/2009* (2013.01); *B60W 10/182* (2013.01);
(Continued)

(58) Field of Classification Search
CPC ........ B60L 53/80; B60L 15/2009; B60L 3/00; B60W 60/001; B60W 2510/1005; B60W 2510/186; B60W 2510/20; B60W 2510/22; B60W 2510/30; B60W 2710/186; B60W 2710/20; B60W 2710/22; B60W 2710/30;
(Continued)

(56) References Cited

FOREIGN PATENT DOCUMENTS

| CN | 111942211 A | 11/2020 |
|---|---|---|
| CN | 112874376 A | 6/2021 |
| CN | 113401000 A | 9/2021 |

*Primary Examiner* — Hai H Huynh
(74) *Attorney, Agent, or Firm* — Nitin Kaushik

(57) ABSTRACT

The invention relates to a state control system and method for a vehicle with a battery to be swapped. The system includes: a central gateway, a vehicle state control module, and a vehicle state monitoring module that are communicatively connected, where after receiving a state-to-be-adjusted signal, the central gateway sends a control instruction to the vehicle state control module and/or the vehicle state monitoring module; the vehicle state control module and/or the vehicle state monitoring module adjust/adjusts, according to the control instruction, a state of the vehicle with a battery to be swapped; and the vehicle state monitoring module obtains an adjusted vehicle state of the vehicle with a battery to be swapped, and determines whether the vehicle state is a preset vehicle state required for a battery swap process of the vehicle with a battery to be swapped. In the invention, various control modules in the vehicle with a battery to be swapped are communicatively connected, to implement automatic adjustment of a state of the vehicle, so that the state of the vehicle with a battery to be swapped can be quickly and accurately adjusted to a state required for a battery swap process.

13 Claims, 2 Drawing Sheets

(51) Int. Cl.
*B60W 10/18* (2012.01)
*B60W 10/20* (2006.01)
*B60W 10/22* (2006.01)
*B60W 10/30* (2006.01)
*B60W 60/00* (2020.01)

(52) U.S. Cl.
CPC ............ *B60W 10/20* (2013.01); *B60W 10/22* (2013.01); *B60W 10/30* (2013.01); *B60W 60/001* (2020.02); *B60W 2510/1005* (2013.01); *B60W 2510/186* (2013.01); *B60W 2510/20* (2013.01); *B60W 2510/22* (2013.01); *B60W 2510/30* (2013.01); *B60W 2556/45* (2020.02); *B60W 2710/186* (2013.01); *B60W 2710/20* (2013.01); *B60W 2710/22* (2013.01); *B60W 2710/30* (2013.01)

(58) Field of Classification Search
CPC ... B60W 30/06; B60G 17/015; B60G 17/052; B60R 16/0231; B60T 13/74; E05F 15/70
USPC ............................ 701/36, 37, 39, 41, 43, 45
See application file for complete search history.

STATE CONTROL SYSTEM AND METHOD FOR VEHICLE WITH BATTERY TO BE SWAPPED, CONTROLLER, AND STORAGE MEDIUM

TECHNICAL FIELD

The invention relates to the field of vehicle automatic control technologies, and in particular, to a state control system for a vehicle with a battery to be swapped and a state control method for a vehicle with a battery to be swapped.

BACKGROUND ART

Currently, as new energy vehicles (for example, electric vehicles) become popular, a battery swap mode emerges to effectively solve pain points in the use of the electric vehicles such as range anxiety and a long charging time. The battery swap mode can alleviate the above pain points as an effective supplement to charging. A battery swap process of swapping a traction battery pack generally relies on manual operation, and especially a state of a vehicle with a battery to be swapped needs to be adjusted manually. The manual operation causes problems of a long battery swap time, potential safety hazards, complicated operation, increased labor cost, and the like.

SUMMARY OF THE INVENTION

In view of the technical problems to be resolved by the invention, a state control system for a vehicle with a battery to be swapped, a state control method for a vehicle with a battery to be swapped, a controller, and a storage medium are provided. Various control modules in the vehicle with a battery to be swapped are communicatively connected, to implement automatic adjustment of a state of the vehicle, so that the state of the vehicle with a battery to be swapped can be quickly and accurately adjusted to a state required for a battery swap process.

To resolve the technical problems, according to one aspect of the invention, a state control system for a vehicle with a battery to be swapped is provided. The system includes: a central gateway, a vehicle state control module, and a vehicle state monitoring module that are communicatively connected;
where after receiving a state-to-be-adjusted signal, the central gateway sends a control instruction to the vehicle state control module and/or the vehicle state monitoring module;
the vehicle state control module and/or the vehicle state monitoring module adjust/adjusts, according to the control instruction, a state of the vehicle with a battery to be swapped; and
the vehicle state monitoring module obtains an adjusted vehicle state of the vehicle with a battery to be swapped, and determines whether the vehicle state is a preset vehicle state required for a battery swap process of the vehicle with a battery to be swapped.

Further, when determining that the vehicle state is the preset vehicle state, the vehicle state monitoring module sends a vehicle state adjustment completion signal to the central gateway.

Further, the vehicle state includes at least one of a steering wheel state, a parking brake state, a suspension state, a child lock state, and a window state; and
corresponding to the vehicle state, the preset vehicle state includes at least one of a preset steering wheel state, a preset parking brake state, a preset suspension state, a preset child lock state, and a preset window state.

Further, the vehicle state control module includes: an autonomous driving control unit and a steering control unit; and
the central gateway sends the control instruction to the vehicle state monitoring module and the autonomous driving control unit;
after receiving the control instruction, the vehicle state monitoring module obtains a current steering wheel state, sends the current steering wheel state to the autonomous driving control unit, and determines whether the steering wheel state is a preset steering wheel state;
the autonomous driving control unit generates a steering wheel adjustment signal according to the control instruction and the current steering wheel state, and sends the steering wheel adjustment signal to the steering control unit; and
the steering control unit controls the steering wheel state according to the steering wheel adjustment signal.

Further, the vehicle state control module includes: a vehicle control unit and an electronic parking brake unit; and
the vehicle control unit sends a gear state to the central gateway;
the electronic parking brake unit sends a current parking brake state to the central gateway, and controls the parking brake state according to a parking brake control signal sent by the central gateway;
the central gateway generates the parking brake control signal according to the gear state and the current parking brake state, and sends the parking brake control signal to the electronic parking brake unit; and
the vehicle state monitoring module obtains the parking brake state, and determines whether the parking brake state is a preset parking brake state.

Further, the vehicle state control module includes: a suspension control unit; and
the central gateway sends a suspension control signal to the vehicle state monitoring module;
the vehicle state monitoring module sends the suspension control signal to the suspension control unit, obtains a suspension state, and determines whether the suspension state is a preset suspension state; and
the suspension control unit adjusts the suspension state according to the suspension adjustment control signal.

Further, the vehicle state control module includes: a child lock control unit; and the central gateway sends a child lock control signal to the vehicle state monitoring module;
the vehicle state monitoring module sends the child lock control signal to the child lock control unit, obtains a child lock state, and determines whether the child lock state is a preset child lock state; and
the child lock control unit adjusts the child lock state according to the child lock control signal.

Further, the vehicle state control module includes: a window control unit; and
the central gateway sends a window control signal to the vehicle state monitoring module;
the vehicle state monitoring module sends the window control signal to the window control unit, obtains a window state, and determines whether the window state is a preset window state; and
the window control unit adjusts the window state according to the window control signal.

Further, after detecting the vehicle with a battery to be swapped, a battery swap station sends the state-to-be-adjusted signal to the central gateway, or the vehicle with a battery to be swapped sends the state-to-be-adjusted signal to the central gateway.

According to another aspect of the invention, a state control method for a vehicle with a battery to be swapped is provided. A central gateway, a vehicle state control module, and a vehicle state monitoring module are communicatively connected; and the method includes:
after receiving a state-to-be-adjusted signal, sending, by the central gateway, a control instruction to the vehicle state control module and/or the vehicle state monitoring module;
adjusting, by the vehicle state control module and/or the vehicle state monitoring module according to the control instruction, a state of the vehicle with a battery to be swapped; and
obtaining, by the vehicle state monitoring module, an adjusted vehicle state of the vehicle with a battery to be swapped, and determining whether the vehicle state is a preset vehicle state required for a battery swap process of the vehicle with a battery to be swapped.

Further, the state control method for a vehicle with a battery to be swapped further includes: when determining that the vehicle state is the preset vehicle state, sending, by the vehicle state monitoring module, a vehicle state adjustment completion signal to the central gateway.

Further, the vehicle state includes at least one of a steering wheel state, a parking brake state, a suspension state, a child lock state, and a window state; and
corresponding to the vehicle state, the preset vehicle state includes at least one of a preset steering wheel state, a preset parking brake state, a preset suspension state, a preset child lock state, and a preset window state.

Further, the vehicle state control module includes: an autonomous driving control unit and a steering control unit; and the step of adjusting, by the vehicle state control module and/or the vehicle state monitoring module according to the control instruction, a state of the vehicle with a battery to be swapped includes:
sending, by the central gateway, the control instruction to the vehicle state monitoring module and the autonomous driving control unit;
after receiving the control instruction, obtaining, by the vehicle state monitoring module, a current steering wheel state, and sending the current steering wheel state to the autonomous driving control unit;
generating, by the autonomous driving control unit, a steering wheel adjustment signal according to the control instruction and the current steering wheel state, and sending the steering wheel adjustment signal to the steering control unit; and
controlling, by the steering control unit, the steering wheel state according to the steering wheel adjustment signal.

Further, the vehicle state control module includes: a vehicle control unit and an electronic parking brake unit; and
the step of adjusting, by the vehicle state control module and/or the vehicle state monitoring module according to the control instruction, a state of the vehicle with a battery to be swapped includes:
sending, by the vehicle control unit, a gear state to the central gateway;
sending, by the electronic parking brake unit, a current parking brake state to the central gateway;
generating, by the central gateway, the parking brake control signal according to the gear state and the current parking brake state, and sending the parking brake control signal to the electronic parking brake unit; and
controlling, by the electronic parking brake unit, the parking brake state according to the parking brake control signal.

Further, the vehicle state control module includes: a suspension control unit; and the step of adjusting, by the vehicle state control module and/or the vehicle state monitoring module according to the control instruction, a state of the vehicle with a battery to be swapped includes:
sending, by the central gateway, a suspension control signal to the vehicle state monitoring module;
sending, by the vehicle state monitoring module, the suspension control signal to the suspension control unit; and
adjusting, by the suspension control unit, a suspension state according to the suspension adjustment control signal.

Further, the vehicle state control module includes: a child lock control unit; and
the step of adjusting, by the vehicle state control module and/or the vehicle state monitoring module according to the control instruction, a state of the vehicle with a battery to be swapped includes:
sending, by the central gateway, a child lock control signal to the vehicle state monitoring module;
sending, by the vehicle state monitoring module, the child lock control signal to the child lock control unit; and
adjusting, by the child lock control unit, a child lock state according to the child lock control signal.

Further, the vehicle state control module includes: a window control unit; and
the step of adjusting, by the vehicle state control module and/or the vehicle state monitoring module according to the control instruction, a state of the vehicle with a battery to be swapped includes: sending, by the central gateway, a window control signal to the vehicle state monitoring module;
sending, by the vehicle state monitoring module, the window control signal to the window control unit; and
adjusting, by the window control unit, a window state according to the window control signal.

Further, the state control method for a vehicle with a battery to be swapped further includes: after detecting the vehicle with a battery to be swapped, sending, by a battery swap station, the state-to-be-adjusted signal to the central gateway, or
sending, by the vehicle with a battery to be swapped, the state-to-be-adjusted signal to the central gateway.

According to still another aspect of the invention, a controller is provided, which includes a memory and a processor, where the memory stores a computer program, and when the program is executed by the processor, the steps of the method according to any one of the foregoing embodiments can be implemented.

According to yet another aspect of the invention, a computer-readable storage medium for storing a computer program is provided, where when the program is executed by a computer or a processor, the steps of the method according to any one of the foregoing embodiments are implemented.

The invention has obvious advantages and beneficial effects as compared with the prior art. By means of the foregoing technical solutions, the state control system for a vehicle with a battery to be swapped, the state control method for a vehicle with a battery to be swapped, the controller, and the storage medium in the invention can achieve considerable technical progressiveness and applicability, have wide use value in the industry, and have at least the following advantages:

(1) The central gateway, the vehicle state control module, and the vehicle state monitoring module are communicatively connected, to implement automatic adjustment of a state of the vehicle with a battery to be swapped, so that a time of a battery swap process can be effectively shortened, safety in the battery swap process can be ensured, personnel participation scenarios can be reduced, and labor cost can be reduced.

(2) The vehicle state monitoring module obtains the adjusted vehicle state, and determines whether the vehicle state reaches a preset vehicle state of the vehicle required for a battery swap process. A verification step is added, so that safety of the battery swap process can be further improved.

The aforementioned description is only an overview of the technical solutions of the invention. In order to clearly understand the technical means of the invention, the invention can be implemented according to the contents of the description; and in order to make the aforementioned and other objects, features and advantages of the invention more obvious and understandable, preferred embodiments are described in detail below with reference to the accompanying drawings.

DETAILED DESCRIPTION OF EMBODIMENTS

In order to further illustrate the technical means used to achieve the intended purpose of the invention and the technical effects thereof, specific implementations of a state control system for a vehicle with a battery to be swapped, a state control method for a vehicle with a battery to be swapped, a controller, and a storage medium proposed in the invention and the effects thereof are described in detail hereinafter in conjunction with the accompanying drawings and the preferred embodiments.

In a battery swap process of a vehicle, the vehicle needs to be kept in a specified state, so as to ensure smoothness of the battery swap process and safety of the battery swap process. In the prior art, manual control by personnel is usually required to adjust the vehicle to a state required for the battery swap process. However, in the personnel control process, inevitably, misoperation occurs, or adjustment of one or more states of the vehicle is missed. This prolongs a time of the battery swap process, and causes more dangers in the battery swap process. In view of the problems, the invention discloses a state control system for a vehicle with a battery to be swapped.

Figure 1:
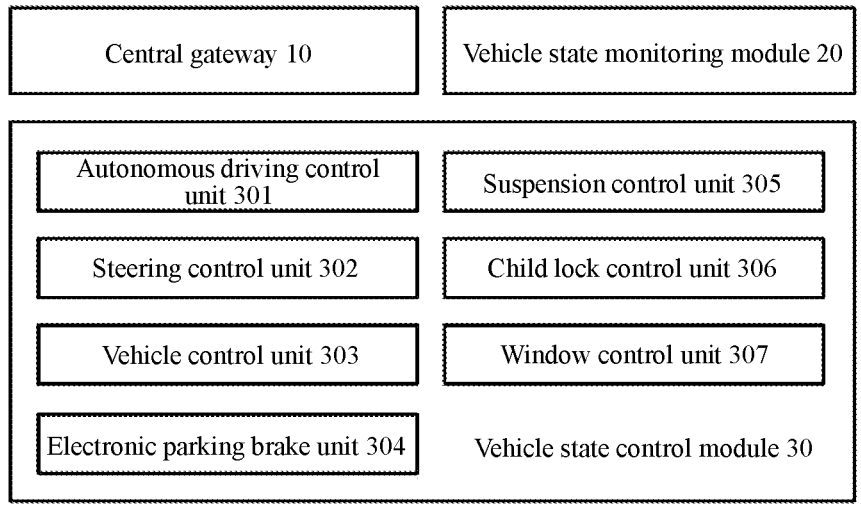
FIG. 1 is a schematic block diagram of a state control system for a vehicle with a battery to be swapped according to an embodiment of the invention.

As shown in FIG. 1, the state control system for a vehicle with a battery to be swapped includes: a central gateway 10, a vehicle state control module 30, and a vehicle state monitoring module 20 that are communicatively connected.

After receiving a state-to-be-adjusted signal, the central gateway 10 sends a control instruction to the vehicle state control module 30 and/or the vehicle state monitoring module 20; the vehicle state control module 30 and/or the vehicle state monitoring module 20 adjust/adjusts, according to the control instruction, a state of the vehicle with a battery to be swapped; and the vehicle state monitoring module 20 obtains an adjusted current state of the vehicle with a battery to be swapped, and determines whether the current state is a preset vehicle state required for a battery swap process of the vehicle with a battery to be swapped.

Specifically, a communication connection is established between the central gateway 10, the vehicle state control module 30, and the vehicle state monitoring module 20, and the communication connection may be a wired connection or a wireless connection, which is not limited in the invention.

In an embodiment, after detecting the vehicle with a battery to be swapped, a battery swap station sends the state-to-be-adjusted signal to the central gateway 10. Specifically, when the vehicle with a battery to be swapped travels to a specified location of the battery swap station, the battery swap station detects the vehicle for battery swap, and sends the state-to-be-adjusted signal to the central gateway 10. After the central gateway 10 receives the state-to-be-adjusted signal, the central gateway 10 determines to enter a vehicle state adjustment mode.

In another embodiment, the vehicle with a battery to be swapped sends the state-to-be-adjusted signal to the central gateway 10. Specifically, when the vehicle with a battery to be swapped travels to a specified location of the battery swap station, the state-to-be-adjusted signal is sent to the central gateway 10 through triggering by personnel or automatic triggering by the vehicle. After the central gateway 10 receives the state-to-be-adjusted signal, the central gateway 10 determines to enter a vehicle state adjustment mode.

After determining to enter the vehicle state adjustment mode, the central gateway 10 sends a corresponding control instruction to the corresponding vehicle state control module 30 and/or the corresponding vehicle state monitoring module 20. After receiving the control instruction, the vehicle state control module 30 and/or the vehicle state monitoring module 20 adjust/adjusts, according to the control instruction, a state of the vehicle with a battery to be swapped, so that the state of the vehicle with a battery to be swapped can satisfy the battery swap process.

In an embodiment, the vehicle state control module 30 includes at least one of an autonomous driving control unit 301, a steering control unit 302, a vehicle control unit 303, an electronic parking brake unit 304, a suspension control unit 305, a child lock control unit 306, and a window control unit 307.

It can be learned that when the vehicle state control module 30 is used to adjust the state of the vehicle, it is possible that adjustment is not complete or adjustment is not performed. In this case, some risks still exist in the battery swap process. Therefore, after the vehicle state control module 30 completes adjusting the vehicle state, the vehicle state control module 30 sends the adjusted vehicle state to the vehicle state monitoring module 20. When obtaining the vehicle state, the vehicle state monitoring module 20 determines whether the vehicle state is a preset vehicle state required for a battery swap process of the vehicle with a battery to be swapped.

In an embodiment, the vehicle state includes at least one of a steering wheel state, a parking brake state, a suspension state, a child lock state, and a window state; and corresponding to the vehicle state, the preset vehicle state includes at least one of a preset steering wheel state, a preset parking brake state, a preset suspension state, a preset child lock state, and a preset window state.

In an embodiment, when determining that the vehicle state is the preset vehicle state, the vehicle state monitoring module 20 sends a vehicle state adjustment completion signal to the central gateway 10.

After receiving the vehicle state adjustment completion signal, the central gateway 10 can enter a next battery swap step. For example, a battery starts to be removed from the vehicle with a battery to be swapped.

When determining that the vehicle state is not the preset vehicle state, the vehicle state monitoring module 20 may issue warning information to notify a staff member or a user to perform manual adjustment, or may send a signal to the central gateway 10. After receiving the signal, the central gateway 10 sends the control instruction again, and then the vehicle state is adjusted.

In an embodiment, after obtaining the adjusted vehicle state of the vehicle with a battery to be swapped, the vehicle state monitoring module 20 displays the vehicle state. For example, displaying is performed using a central control display area in the vehicle. In this way, personnel in the vehicle can learn the current state of the vehicle in a timely manner.

In a specific embodiment, the vehicle state control module 30 includes: an autonomous driving control unit 301 and a steering control unit 302; the central gateway 10 sends the control instruction to the vehicle state monitoring module 20 and the autonomous driving control unit 301; after receiving the control instruction, the vehicle state monitoring module 20 obtains a current steering wheel state, sends the current steering wheel state to the autonomous driving control unit 301, and determines whether the steering wheel state is a preset steering wheel state; the autonomous driving control unit 301 generates a steering wheel adjustment signal according to the control instruction and the current steering wheel state, and sends the steering wheel adjustment signal to the steering control unit 302; and the steering control unit 302 controls the steering wheel state according to the steering wheel adjustment signal.

Specifically, after the vehicle state monitoring module 20 and the autonomous driving control unit 301 receive the control instruction sent by the central gateway 10, the vehicle state monitoring module 20 obtains a current steering wheel state of a steering wheel by using the steering control unit 302. After the current steering wheel state is obtained, the current steering wheel state is sent to the autonomous driving control unit 301, the autonomous driving control unit 301 generates a steering wheel adjustment signal according to the control instruction sent by the central gateway 10 and the current steering wheel state. After receiving the steering wheel adjustment signal, the steering control unit 302 controls the steering wheel state according to the steering wheel adjustment signal. Then, the vehicle state monitoring module 20 obtains the adjusted steering wheel state, and determines whether the adjusted steering wheel state is a preset steering wheel state required for the battery swap process.

More specifically, the control instruction sent by the central gateway 10 includes a rotation angle (that is, the preset steering wheel state) of the steering wheel required for a charging process. After the vehicle state monitoring module 20 receives the control instruction, a current rotation angle (that is, a current steering wheel state) of the steering wheel is obtained by using the steering control unit 302. In addition, the current rotation angle is sent to the autonomous driving control unit 301, the autonomous driving control unit 301 calculates a to-be-adjusted rotation angle (that is, a steering wheel control signal) of the steering wheel according to the rotation angle in the charging process and the current rotation angle. After receiving the to-be-adjusted rotation angle of the steering wheel, the steering control unit 302 controls, according to the to-be-adjusted rotation angle, the steering wheel to rotate. After angle adjustment of the steering wheel is completed, the vehicle state monitoring module 20 obtains an adjusted steering wheel rotation angle (that is, a steering wheel state), and determines whether the adjusted steering wheel rotation angle is a rotation angle required for the charging process.

In a specific embodiment, the vehicle state control module 30 includes: a vehicle control unit 303 and an electronic parking brake unit 304; the vehicle control unit 303 sends a gear state to the central gateway 10; the electronic parking brake unit 304 sends a current parking brake state to the central gateway 10, and controls the parking brake state according to a parking brake control signal sent by the central gateway 10; the central gateway 10 generates the parking brake control signal according to the gear state and the current parking brake state, and sends the parking brake control signal to the electronic parking brake unit 304; and the vehicle state monitoring module 20 obtains the parking brake state, and determines whether the parking brake state is a preset parking brake state.

Specifically, the vehicle control unit 303 sends, to the central gateway 10, gear information of the vehicle with a battery to be swapped, and the electronic parking brake unit 304 sends the current parking brake state to the central gateway 10. The central gateway 10 generates the parking brake control signal according to the gear information and the current parking brake state, and sends the parking brake control signal to the electronic parking brake unit 304. After receiving the parking brake control signal, the electronic parking brake unit 304 controls the parking brake state according to the parking brake control signal. After adjustment of the parking brake state is completed, the vehicle state monitoring module 20 obtains the parking brake state of the vehicle with a battery to be swapped, and determines whether the obtained parking brake state is a preset parking brake state required for the battery swap process.

More specifically, when the parking brake state sent by the electronic parking brake unit 304 to the central gateway 10 is an electronic parking brake being released, a state of the electronic parking brake has already been the preset parking brake state. In this case, the central gateway 10 does not need to send the control instruction. When the parking brake state is an electronic parking brake being not released, the central gateway 10 sends a control instruction for releasing the electronic parking brake. After receiving the control instruction for releasing the electronic parking brake, the electronic parking brake unit 304 controls to release the electronic parking brake. After adjustment of the parking brake state is completed, the vehicle state monitoring module 20 obtains the adjusted parking brake state, and determines whether the adjusted parking brake state is the electronic parking brake being released.

In a specific embodiment, the vehicle state control module 30 includes: a suspension control unit 305; the central gateway 10 sends a suspension control signal to the vehicle state monitoring module 20; the vehicle state monitoring module 20 sends the suspension control signal to the suspension control unit 305, obtains a suspension state, and determines whether the suspension state is a preset suspension state; and the suspension control unit 305 adjusts a suspension state according to the suspension adjustment control signal.

Specifically, the central gateway 10 sends, to the vehicle state monitoring module 20, a suspension control signal for deactivating an air suspension. The vehicle state monitoring module 20 sends, to the suspension control unit 305, the instruction for deactivating the air suspension. The suspension control unit 305 controls the air suspension according to the instruction for deactivating the air suspension. After a state of the air suspension is adjusted, the vehicle state monitoring module 20 obtains a current state of the air suspension, and determines whether the current state is a deactivated state.

In a specific embodiment, the vehicle state control module 30 includes: a child lock control unit 306; the central gateway 10 sends a child lock control signal to the vehicle state monitoring module 20; the vehicle state monitoring module 20 sends the child lock control signal to the child lock control unit 306, obtains a child lock state, and determines whether the child lock state is a preset child lock state; and the child lock control unit 306 adjusts the child lock state according to the child lock control signal.

Specifically, the central gateway 10 sends a child lock enabling signal to the vehicle state monitoring module 20. The vehicle state monitoring module 20 sends the child lock enabling signal to the child lock control unit 306. The child lock control unit 306 controls the child lock state according to the child lock enabling signal. After a state of a child lock is adjusted, the vehicle state monitoring module 20 obtains a current state of the child lock, and determines whether the current state is the preset child lock state.

More specifically, after receiving the child lock enabling signal, the child lock control unit 306 controls the child lock to be activated, that is, a child lock function of the vehicle is enabled.

In a specific embodiment, the vehicle state control module 30 includes: a window control unit 307; the central gateway 10 sends a window control signal to the vehicle state monitoring module 20; the vehicle state monitoring module 20 sends the window control signal to the window control unit 307, obtains a window state, and determines whether the window state is a preset window state; and the window control unit 307 adjusts the window state according to the window control signal.

Specifically, the central gateway 10 sends the window control signal for opening a window to the vehicle state monitoring module 20. The vehicle state monitoring module 20 sends the instruction for opening the window to the window control unit 307. The window control unit 307 controls the window according to the instruction for opening the window. After a state of the window is adjusted, the vehicle state monitoring module 20 obtains a current state of the window, and determines whether the current state is an open state.

According to embodiments of the invention, a state control method for a vehicle with a battery to be swapped is further provided. The method is used for the state control system for the vehicle with a battery to be swapped. The system includes: a central gateway, a vehicle state control module, and a vehicle state monitoring module that are communicatively connected.

Specifically, a communication connection is established between the central gateway, the vehicle state control module, and the vehicle state monitoring module, and the communication connection may be a wired connection or a wireless connection, which is not limited in the invention.

Figure 2:
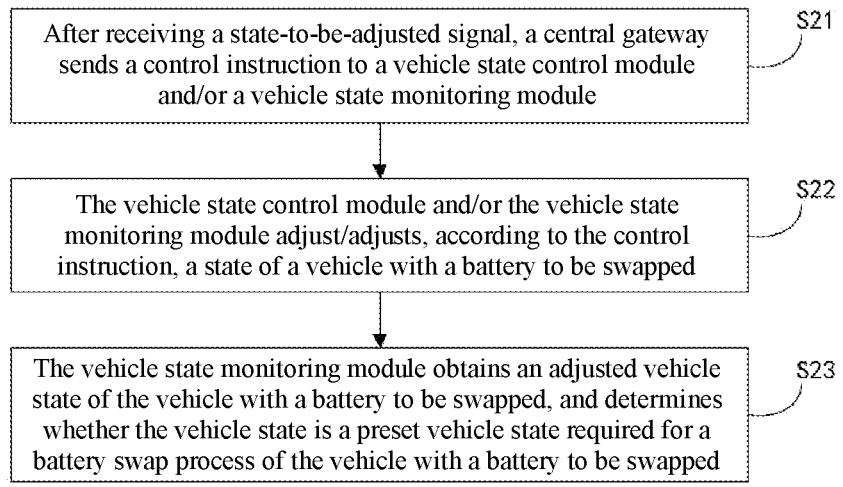
FIG. 2 is a schematic flowchart of a state control method for a vehicle with a battery to be swapped according to an embodiment of the invention.

As shown in FIG. 2, the method includes:
step S21: after receiving a state-to-be-adjusted signal, the central gateway sends a control instruction to the vehicle state control module and/or the vehicle state monitoring module;
step S22: the vehicle state control module and/or the vehicle state monitoring module adjust/adjusts, according to the control instruction, a state of the vehicle with a battery to be swapped; and
step S23: the vehicle state monitoring module obtains an adjusted vehicle state of the vehicle with a battery to be swapped, and determines whether the vehicle state is a preset vehicle state required for a battery swap process of the vehicle with a battery to be swapped.

In an embodiment, after detecting the vehicle with a battery to be swapped, a battery swap station sends the state-to-be-adjusted signal to the central gateway. Specifically, when the vehicle with a battery to be swapped travels to a specified location of the battery swap station, the battery swap station detects the vehicle for battery swap, and sends the state-to-be-adjusted signal to the central gateway. After the central gateway receives the state-to-be-adjusted signal, the central gateway determines to enter a vehicle state adjustment mode.

In another embodiment, the vehicle with a battery to be swapped sends the state-to-be-adjusted signal to the central gateway. Specifically, when the vehicle with a battery to be swapped travels to a specified location of the battery swap station, the state-to-be-adjusted signal is sent to the central gateway through triggering by personnel or automatic triggering by the vehicle. After the central gateway receives the state-to-be-adjusted signal, the central gateway determines to enter a vehicle state adjustment mode.

After determining to enter the vehicle state adjustment mode, the central gateway sends a corresponding control instruction to the corresponding vehicle state control module and/or the corresponding vehicle state monitoring module. After receiving the control instruction, the vehicle state control module and/or the vehicle state monitoring module adjust/adjusts, according to the control instruction, a state of the vehicle with a battery to be swapped, so that the state of the vehicle with a battery to be swapped can satisfy the battery swap process.

In an embodiment, the vehicle state control module includes at least one of an autonomous driving control unit, a steering control unit, a vehicle control unit, an electronic parking brake unit, a suspension control unit, a child lock control unit, and a window control unit.

It can be learned that when the vehicle state control module is used to adjust the state of the vehicle, it is possible that adjustment is not complete or adjustment is not performed. In this case, some risks still exist in the battery swap process. Therefore, after the vehicle state control module completes adjusting the vehicle state, the vehicle state control module sends the adjusted vehicle state to the vehicle state monitoring module. When obtaining the vehicle state, the vehicle state monitoring module determines whether the vehicle state is a preset vehicle state required for a battery swap process of the vehicle with a battery to be swapped.

In an embodiment, the vehicle state includes at least one of a steering wheel state, a parking brake state, a suspension state, a child lock state, and a window state; and corresponding to the vehicle state, the preset vehicle state includes at least one of a preset steering wheel state, a preset parking brake state, a preset suspension state, a preset child lock state, and a preset window state.

In an embodiment, when determining that the vehicle state is the preset vehicle state, the vehicle state monitoring module sends a vehicle state adjustment completion signal to the central gateway.

After receiving the vehicle state adjustment completion signal, the central gateway can enter a next battery swap step. For example, a battery starts to be removed from the vehicle with a battery to be swapped.

When determining that the vehicle state is not the preset vehicle state, the vehicle state monitoring module may issue warning information to notify a staff member or a user to perform manual adjustment, or may send a signal to the central gateway. After receiving the signal, the central gateway sends the control instruction again, and then the vehicle state is adjusted.

In an embodiment, after obtaining the adjusted vehicle state of the vehicle with a battery to be swapped, the vehicle state monitoring module displays the vehicle state. For example, displaying is performed using a central control display area in the vehicle. In this way, personnel in the vehicle can learn the current state of the vehicle in a timely manner.

In a specific embodiment, the vehicle state control module includes: an autonomous driving control unit and a steering control unit.

Step S22 specifically includes: sending, by the central gateway, the control instruction to the vehicle state monitoring module and the autonomous driving control unit; after receiving the control instruction, obtaining, by the vehicle state monitoring module, a current steering wheel state, and sending the current steering wheel state to the autonomous driving control unit; generating, by the autonomous driving control unit, a steering wheel adjustment signal according to the control instruction and the current steering wheel state, and sending the steering wheel adjustment signal to the steering control unit; and controlling, by the steering control unit, the steering wheel state according to the steering wheel adjustment signal.

Specifically, after the vehicle state monitoring module and the autonomous driving control unit receive the control instruction sent by the central gateway, the vehicle state monitoring module obtains a current steering wheel state of a steering wheel by using the steering control unit. After the current steering wheel state is obtained, the current steering wheel state is sent to the autonomous driving control unit, the autonomous driving control unit generates a steering wheel adjustment signal according to the control instruction sent by the central gateway and the current steering wheel state. After receiving the steering wheel adjustment signal, the steering control unit controls the steering wheel state according to the steering wheel adjustment signal.

More specifically, the control instruction sent by the central gateway includes a rotation angle (that is, the preset steering wheel state) of the steering wheel required for a charging process. After the vehicle state monitoring module receives the control instruction, a current rotation angle (that is, a current steering wheel state) of the steering wheel is obtained by using the steering control unit. In addition, the current rotation angle is sent to the autonomous driving control unit, the autonomous driving control unit calculates a to-be-adjusted rotation angle (that is, a steering wheel control signal) of the steering wheel according to the rotation angle in the charging process and the current rotation angle. After receiving the to-be-adjusted rotation angle of the steering wheel, the steering control unit controls, according to the to-be-adjusted rotation angle, the steering wheel to rotate.

In a specific embodiment, the vehicle state control module includes: a vehicle control unit and an electronic parking brake unit.

Step S22 specifically includes: sending, by the vehicle control unit, a gear state to the central gateway; sending, by the electronic parking brake unit, a current parking brake state to the central gateway, and controlling the parking brake state according to a parking brake control signal sent by the central gateway; generating, by the central gateway, the parking brake control signal according to the gear state and the current parking brake state, and sending the parking brake control signal to the electronic parking brake unit; and controlling, by the electronic parking brake unit, the parking brake state according to the parking brake control signal.

Specifically, the vehicle control unit sends, to the central gateway, gear information of the vehicle with a battery to be swapped, and the electronic parking brake unit sends the current parking brake state to the central gateway. The central gateway generates the parking brake control signal according to the gear information and the current parking brake state, and sends the parking brake control signal to the electronic parking brake unit. After receiving the parking brake control signal, the electronic parking brake unit controls the parking brake state according to the parking brake control signal.

More specifically, when the parking brake state sent by the electronic parking brake unit to the central gateway is an electronic parking brake being released, a state of the electronic parking brake has already been the preset parking brake state. In this case, the central gateway does not need to send the control instruction. When the parking brake state is an electronic parking brake being not released, the central gateway sends a control instruction for releasing the electronic parking brake. After receiving the control instruction for releasing the electronic parking brake, the electronic parking brake unit controls to release the electronic parking brake.

In a specific embodiment, the vehicle state control module includes: a suspension control unit.

Step S22 specifically includes: sending, by the central gateway, a suspension control signal to the vehicle state monitoring module; sending, by the vehicle state monitoring module, the suspension control signal to the suspension control unit; and adjusting, by the suspension control unit, a suspension state according to the suspension adjustment control signal.

Specifically, the central gateway sends, to the vehicle state monitoring module, a suspension control signal for deactivating an air suspension. The vehicle state monitoring module sends, to the suspension control unit, the instruction for deactivating the air suspension. The suspension control unit controls the air suspension according to the instruction for deactivating the air suspension. After a state of the air suspension is adjusted, the vehicle state monitoring module obtains a current state of the air suspension, and determines whether the current state is a deactivated state.

In a specific embodiment, the vehicle state control module includes: a child lock control unit.

Step S22 specifically includes: sending, by the central gateway, a child lock control signal to the vehicle state monitoring module; sending, by the vehicle state monitoring module, the child lock control signal to the child lock control unit; and adjusting, by the child lock control unit, a child lock state according to the child lock control signal.

Specifically, the central gateway sends a child lock enabling signal to the vehicle state monitoring module. The vehicle state monitoring module sends the child lock enabling signal to the child lock control unit. The child lock control unit controls a child lock state according to the child lock enabling signal. After a state of a child lock is adjusted, the vehicle state monitoring module obtains a current state of the child lock, and determines whether the current state is the preset child lock state.

More specifically, after receiving the child lock enabling signal, the child lock control unit controls the child lock to be activated, that is, a child lock function of the vehicle is enabled.

In a specific embodiment, the vehicle state control module includes: a window control unit.

Step S22 specifically includes: sending, by the central gateway, a window control signal to the vehicle state monitoring module; sending, by the vehicle state monitoring module, the window control signal to the window control unit; and adjusting, by the window control unit, a window state according to the window control signal.

Specifically, the central gateway sends the window control signal for opening a window to the vehicle state monitoring module. The vehicle state monitoring module sends the instruction for opening the window to the window control unit. The window control unit controls the window according to the instruction for opening the window. After a state of the window is adjusted, the vehicle state monitoring module obtains a current state of the window, and determines whether the current state is an open state.

According to embodiments of the invention, a state control system for a vehicle with a battery to be swapped is further provided. The system includes a central gateway 41, a digital cockpit module 42 (that is, a vehicle state monitoring module), an autonomous driving controller 43 (that is, an autonomous driving control unit), a steering controller 44 (that is, a steering control unit), a vehicle controller 46 (that is, a vehicle control unit), an electronic parking brake module 45 (that is, an electronic parking brake unit), a suspension controller 47 (that is, a suspension control unit), a child lock module 48 (that is, a child lock control unit), and a window module 49 (that is, a window control unit).

Vehicle state control includes automatic vehicle state adjustment, including steering wheel angle adjustment, electronic parking brake release, air suspension deactivation, child lock activation, and window opening.

In addition, monitoring of an automatic adjustment process and displaying of a notification of an operation process are performed by using the digital cockpit module 42.

Figure 3:
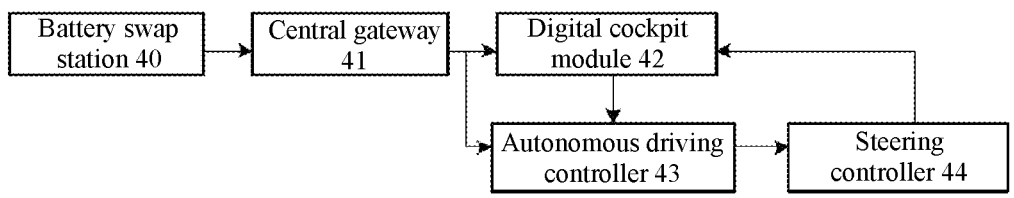
FIG. 3 is a schematic block diagram of a state control system for a vehicle with a battery to be swapped according to a first specific embodiment of the invention.

As shown in FIG. 3, the battery swap station 40 sends a vehicle preparation signal to the central gateway 41; the central gateway 41 determines to enter a vehicle state adjustment mode, and sends a vehicle state adjustment signal to the digital cockpit module 42 and the autonomous driving controller 43; the digital cockpit module 42 sends a steering wheel state signal to the autonomous driving controller 43; the autonomous driving controller 43 sends a steering wheel adjustment signal to the steering controller 44 according to the steering wheel state; and the steering controller 44 adjusts an angle of a steering wheel. The digital cockpit module 42 obtains the steering wheel state signal from the steering controller 44 to monitor an angle state of the steering wheel and display a notification.

Figure 4:
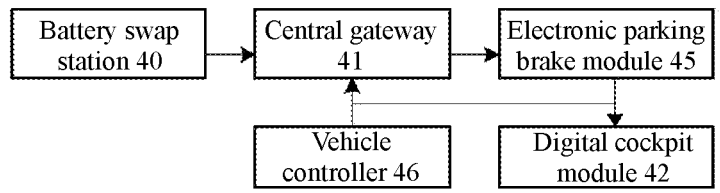
FIG. 4 is a schematic block diagram of a state control system for a vehicle with a battery to be swapped according to a second specific embodiment of the invention.

As shown in FIG. 4, the battery swap station 40 sends a vehicle preparation signal to the central gateway 41; the central gateway 41 determines to enter a vehicle state adjustment mode; the central gateway 41 receives a gear state signal from the vehicle controller 46 and an electronic parking brake state signal from the electronic parking brake module 45; the central gateway 41 determines to issue an electronic parking brake releasing signal according to the gear state signal and the electronic parking brake state signal; and the electronic parking brake module 45 releases an electronic parking brake. The digital cockpit module 42 obtains the electronic parking brake state signal from the electronic parking brake module 45 to monitor an electronic parking brake state and display a notification.

Figure 5:
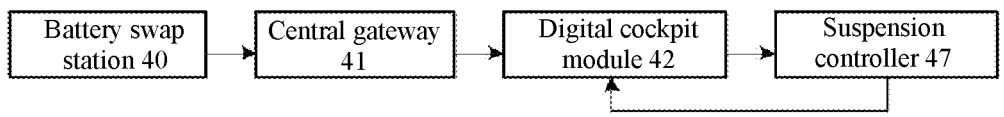
FIG. 5 is a schematic block diagram of a state control system for a vehicle with a battery to be swapped according to a third specific embodiment of the invention.

As shown in FIG. 5, the battery swap station 40 sends a vehicle preparation signal to the central gateway 41; the central gateway 41 determines to enter a vehicle state adjustment mode, and sends a vehicle state adjustment signal to the digital cockpit module 42; the digital cockpit module 42 sends, to the suspension controller 47, an adjustment signal for deactivating an air suspension; and the suspension controller 47 executes an adjustment command for deactivating the air suspension. The digital cockpit module 42 obtains a suspension state signal from the suspension controller 47 to monitor a suspension state and display a notification.

Figure 6:
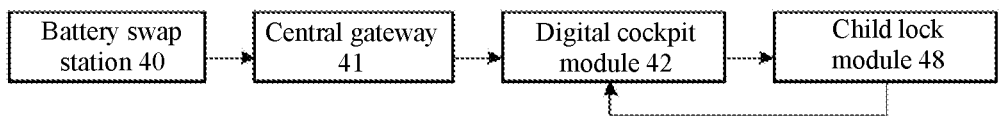
FIG. 6 is a schematic block diagram of a state control system for a vehicle with a battery to be swapped according to a fourth specific embodiment of the invention.

As shown in FIG. 6, the battery swap station 40 sends a vehicle preparation signal to the central gateway 41; the central gateway 41 determines to enter a vehicle state adjustment mode, and sends a vehicle state adjustment signal to the digital cockpit module 42; the digital cockpit module 42 sends a child lock enabling signal to the child lock module 48; and the child lock module 48 executes a child lock enabling command to activate a child lock. The digital cockpit module 42 obtains a child lock state signal from the child lock module 48 to monitor a child lock state and display a notification.

Figure 7:
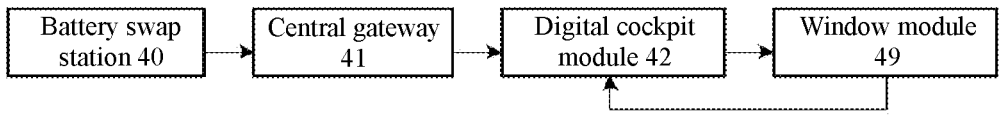
FIG. 7 is a schematic block diagram of a state control system for a vehicle with a battery to be swapped according to a fifth specific embodiment of the invention.

As shown in FIG. 7, the battery swap station 40 sends a vehicle preparation signal to the central gateway 41; the central gateway 41 determines to enter a vehicle state adjustment mode, and sends a vehicle state adjustment signal to the digital cockpit module 42; the digital cockpit module 42 sends a window opening signal to the window module 49; and the window module 49 executes a window opening command. The digital cockpit module 42 obtains a window state signal from the window module 49 to monitor a window state and display a notification.

Figure 8:
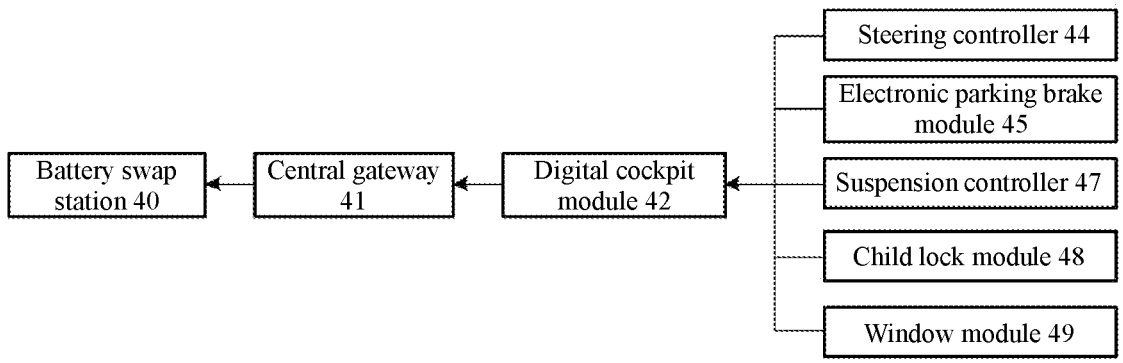
FIG. 8 is a schematic block diagram of a state control system for a vehicle with a battery to be swapped according to a sixth specific embodiment of the invention.

As shown in FIG. 8, the battery swap station 40 sends a vehicle preparation signal to the central gateway 41; the central gateway 41 determines to enter a vehicle state adjustment mode; the digital cockpit module 42 obtains state signals from the execution modules (that is, the steering controller 44, the electronic parking brake module 45, the suspension controller 47, the child lock module 48, and the window module 49) to monitor completion states of all processes; after a vehicle state required for battery swap is satisfied, the digital cockpit module 42 sends a vehicle preparation process completion signal to the central gateway 41; and the central gateway 41 enters a next battery swap step.

In this embodiment, communication between the control modules in the vehicle is used to implement vehicle state adjustment in the battery swap process, so that manual operation is reduced.

An embodiment of the invention further provides a controller, which includes a memory and a processor, where the memory stores a computer program, and when the program is executed by the processor, the steps of the method are implemented.

An embodiment of the invention further provides a computer-readable storage medium for storing a computer program, where when the program is executed by a computer or a processor, the steps of the method are implemented.

The foregoing descriptions are merely preferred embodiments of the invention, and are not intended to limit the invention in any form. Although the invention has been disclosed as above by means of the preferred embodiments, these embodiments are not for the purpose of limiting the invention. Those skilled in the art can make alterations or modifications to the technical contents disclosed above without departing from the technical solutions of the invention so as to arrive at equivalent embodiments with equivalent changes. However, any simple amendments, equivalent changes and modifications made to the above embodiments according to the technical essence of the invention without departing from the technical solutions of the invention are still within the scope of the technical solutions of the invention.

What is claimed is:

1. A state control system for a vehicle with a battery to be swapped, comprising: a central gateway (10), a vehicle state control module (30), and a vehicle state monitoring module (20) that are communicatively connected,
wherein after receiving a state-to-be-adjusted signal, the central gateway (10) is configured to send a control instruction to the vehicle state control module (30) and/or the vehicle state monitoring module (20);
the vehicle state control module (30) and/or the vehicle state monitoring module (20) is/are configured to adjust, according to the control instruction, a state of the vehicle with a battery to be swapped; and
the vehicle state monitoring module (20) is configured to obtain an adjusted vehicle state of the vehicle with a battery to be swapped, and determine whether the vehicle state is a preset vehicle state required for a battery swap process of the vehicle with a battery to be swapped,
when the system determines that the vehicle state is the preset vehicle state, it is configured to send, by the vehicle state monitoring module (20), a vehicle state adjustment completion signal to the central gateway (10);
when the system determines that the vehicle state is not the preset vehicle state, the vehicle state monitoring module (20) is configured to issue warning information or instruct the central gateway (10) to resend the control instruction to adjust the state of the vehicle again.

2. The state control system for a vehicle with a battery to be swapped according to claim 1, wherein the vehicle state comprises at least one of a steering wheel state, a parking brake state, a suspension state, a child lock state, and a window state; and corresponding to the vehicle state, the preset vehicle state comprises at least one of a preset steering wheel state, a preset parking brake state, a preset suspension state, a preset child lock state, and a preset window state.

3. The state control system for a vehicle with a battery to be swapped according to claim 1, wherein the vehicle state control module (30) comprises: an autonomous driving control unit (301) and a steering control unit (302); and
the central gateway (10) is configured to send the control instruction to the vehicle state monitoring module (20) and the autonomous driving control unit (301);
after receiving the control instruction, the vehicle state monitoring module (20) is configured to obtain a current steering wheel state, send the current steering wheel state to the autonomous driving control unit (301), and determine whether the steering wheel state is a preset steering wheel state;
the autonomous driving control unit (301) is configured to generate a steering wheel adjustment signal according to the control instruction and the current steering wheel state, and send the steering wheel adjustment signal to the steering control unit (302); and
the steering control unit (302) is configured to control the steering wheel state according to the steering wheel adjustment signal.

4. The state control system for a vehicle with a battery to be swapped according to claim 1, wherein the vehicle state control module (30) comprises: a vehicle control unit (303) and an electronic parking brake unit (304); and
the vehicle control unit (303) is configured to send a gear state to the control gateway (10);
the electronic parking brake unit (304) is configured to send a current parking brake state to the central gateway (10), and control the parking brake state according to a parking brake control signal sent by the central gateway (10);
the central gateway (10) is configured to generate the parking brake control signal according to the gear state and the current parking brake state, and send the parking brake control signal to the electronic parking brake unit (304); and
the vehicle state monitoring module (20) is configured to obtain the parking brake state, and determine whether the parking brake state is a preset parking brake state.

5. The state control system for a vehicle with a battery to be swapped according to claim 1, wherein the vehicle state control module (30) comprises: a suspension control unit (305); and
the central gateway (10) is configured to send a suspension control signal to the vehicle state monitoring module (20);
the vehicle state monitoring module (20) is configured to send the suspension control signal to the suspension control unit (305), obtain a suspension state, and determine whether the suspension state is a preset suspension state; and
the suspension control unit (305) is configured to adjust the suspension state according to the suspension adjustment control signal.

6. The state control system for a vehicle with a battery to be swapped according to claim 1, wherein the vehicle state control module (30) comprises: a child lock control unit (306); and
the central gateway (10) is configured to send a child lock control signal to the vehicle state monitoring module (20);

the vehicle state monitoring module (20) is configured to send the child lock control signal to the child lock control unit (306), obtain a child lock state, and determine whether the child lock state is a preset child lock state; and the child lock control unit (306) is configured to adjust the child lock state according to the child lock control signal.

7. The state control system for a vehicle with a battery to be swapped according to claim 1, wherein the vehicle state control module (30) comprises: a window control unit (307); and the central gateway (10) is configured to send a window control signal to the vehicle state monitoring module (20);

the vehicle state monitoring module (20) is configured to send the window control signal to the window control unit (302), obtain a window state, and determine whether the window state is a preset window state; and the window control unit (307) is configured to adjust the window state according to the window control signal.

8. The state control system for a vehicle with a battery to be swapped according to claim 1, wherein after detecting the vehicle with a battery to be swapped, a battery swap station is configured to send the state-to-be-adjusted signal to the central gateway (10), or the vehicle with a battery to be swapped is configured to send the state-to-be-adjusted signal to the central gateway (10).

9. The state control method for a vehicle with a battery to be swapped according to claim 8, wherein the vehicle state control module (30) comprises: an autonomous driving control unit (301) and a steering control unit (302); and the step of adjusting, by the vehicle state control module (30) and/or the vehicle state monitoring module (20) according to the control instruction, a state of the vehicle with a battery to be swapped comprises:

sending, by the central gateway (10), the control instruction to the vehicle state monitoring module (20) and the autonomous driving control unit (301);

after receiving the control instruction, obtaining, by the vehicle state monitoring module (20), a current steering wheel state, and sending the current steering wheel state to the autonomous driving control unit (301);

generating, by the autonomous driving control unit (301), a steering wheel adjustment signal according to the control instruction and the current steering wheel state, and sending the steering wheel adjustment signal to the steering control unit (302); and controlling, by the steering control unit (302), the steering wheel state according to the steering wheel adjustment signal.

10. The state control method for a vehicle with a battery to be swapped according to claim 8, wherein the vehicle state control module (30) comprises: a vehicle control unit (303) and an electronic parking brake unit (304); and the step of adjusting, by the vehicle control module (30) and/or the vehicle state monitoring module (20) according to the control instruction, a state of the vehicle with a battery to be swapped comprises:

sending, by the vehicle control unit (303), a gear state to the central gateway (10);

sending, by the electronic parking brake unit (304), a current parking brake state to the central gateway (10);

generating, by the central gateway (10), the parking brake control signal according to the gear state and the current parking brake state, and sending the parking brake control signal to the electronic parking brake unit (304); and controlling, by the electronic parking brake unit (304), the parking brake state according to the parking brake control signal.

11. A state control method for a vehicle with a battery to be swapped, wherein the method is used for a state control system for a vehicle with a battery to be swapped, and the system comprises: a central gateway (10), a vehicle state control (20), and a vehicle state monitoring module (20) that are communicatively connected; and the method comprises:

after receiving a state-to-be-adjusted signal, sending, by the central gateway (10), a control instruction to the vehicle state control module (30) and/or the vehicle state monitoring module (20);

adjusting, by the vehicle state control module (30) and/or the vehicle state monitoring module (20) according to the control instruction, a state of the vehicle with a battery to be swapped; and obtaining, by the vehicle state monitoring module (20), an adjusted vehicle state of the vehicle with a battery to be swapped, and determining whether the vehicle state is a preset vehicle state required for a battery swap process of the vehicle with a battery to be swapped, when determining that the vehicle state is the preset vehicle state, sending, by the vehicle state monitoring module (20), a vehicle state adjustment completion signal to the central gateway (10), when determining that the vehicle state is not the preset vehicle state, the vehicle state monitoring module (20) issues warning information or instructs the central gateway (10) to resend the control instruction to adjust the state of the vehicle again.

12. The state control method for a vehicle with a battery to be swapped according to claim 11, wherein the vehicle state comprises at least one of a steering wheel state, a parking brake state, a suspension state, a child lock state, and a window state; and corresponding to the vehicle state, the preset vehicle state comprises at least one of a preset steering wheel state, a preset parking brake state, a preset suspension state, a preset child lock state, and a preset window state.

13. A controller, comprising a memory and a processor, wherein the memory stores a computer program, and when the program is executed by the processor, the steps of the method according to claim 11 can be implemented.

* * * * *